Figure 1:
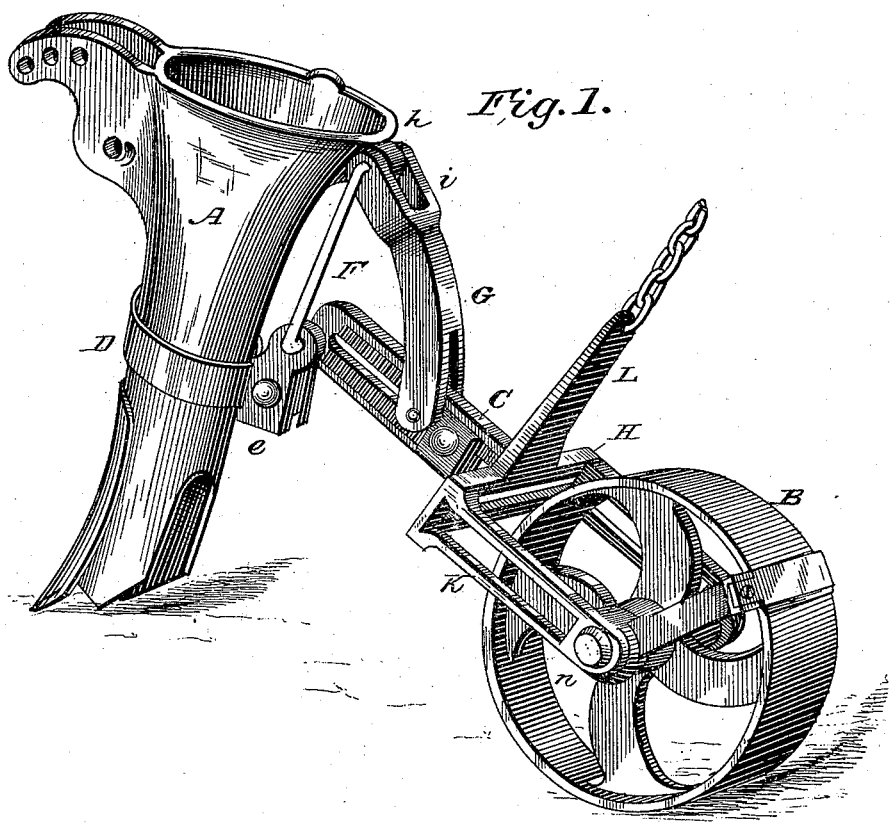

(No Model.) 3 Sheets—Sheet 1.

J. HAMILTON.
SEED DRILL.

No. 310,584. Patented Jan. 13, 1885.

WITNESSES:
Fred. G. Dieterich
J. H. Blackwood

INVENTOR.
John Hamilton
By W. H. Doolittle
ATTORNEY.

(No Model.) 3 Sheets—Sheet 2.
J. HAMILTON.
SEED DRILL.
No. 310,584. Patented Jan. 13, 1885.
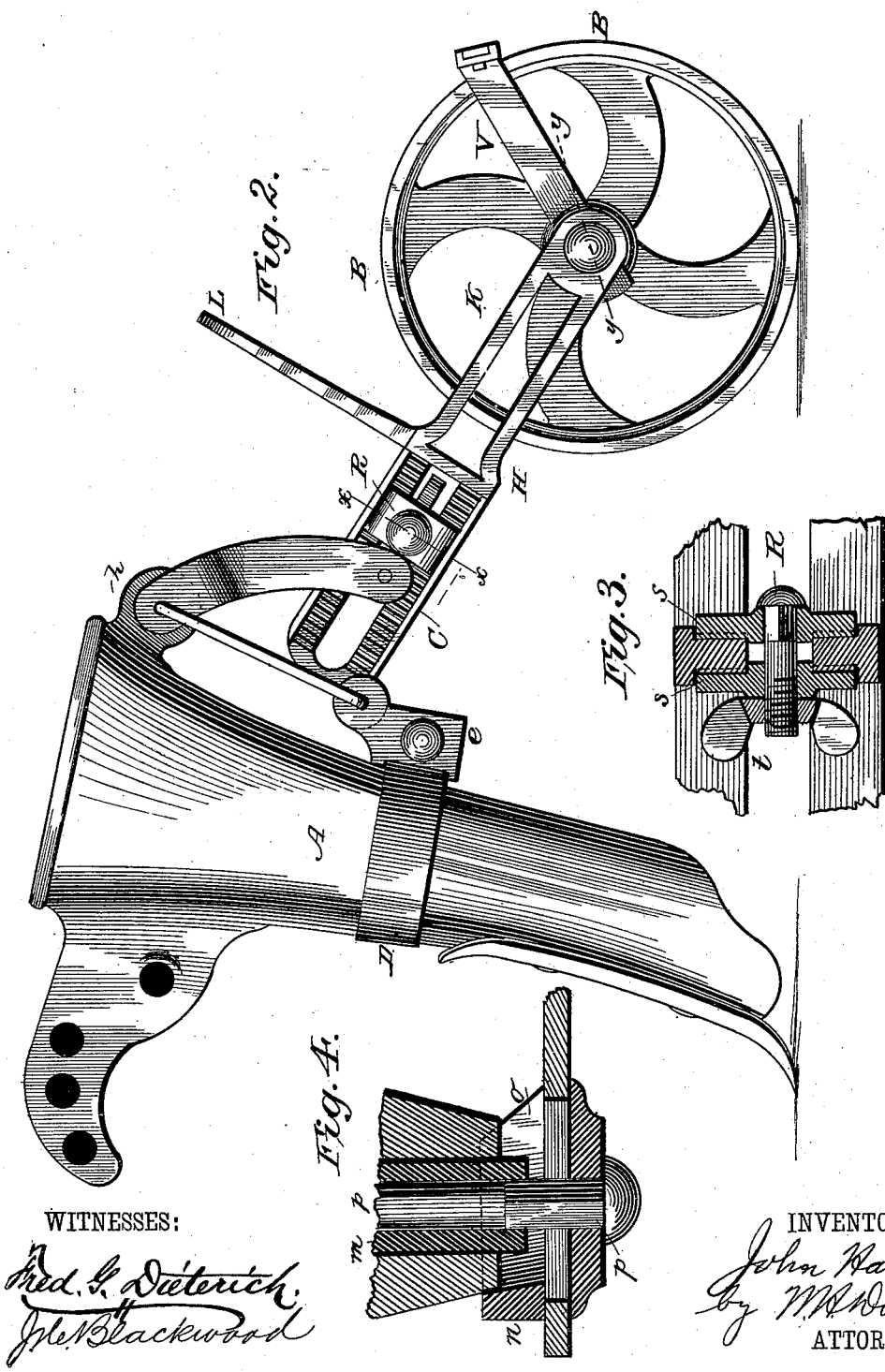
WITNESSES:
Fred. G. Dieterich
J. N. Blackwood
INVENTOR.
John Hamilton
by M. A. Doolittle
ATTORNEY.

(No Model.) 3 Sheets—Sheet 3.
J. HAMILTON.
SEED DRILL.
No. 310,584. Patented Jan. 13, 1885.
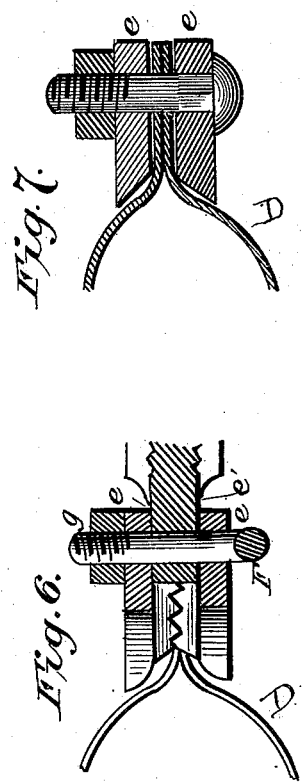
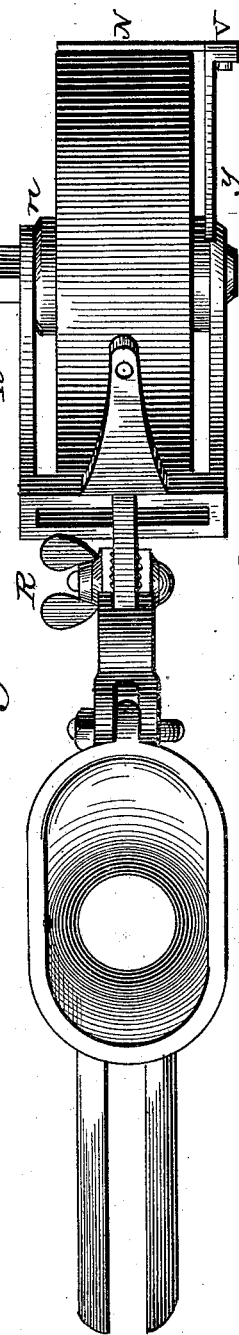
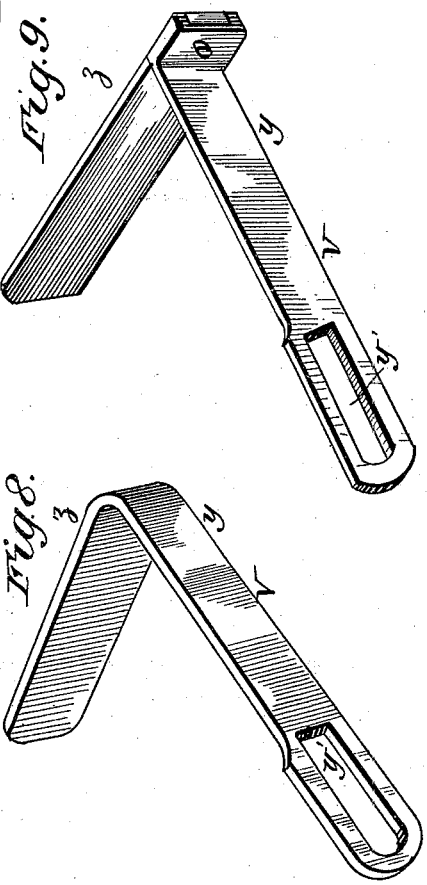
WITNESSES:
Fred. G. Dieterich.
J. C. Blackwood
INVENTOR.
John Hamilton
by W. H. Doolittle
ATTORNEY.

UNITED STATES PATENT OFFICE.

JOHN HAMILTON, OF STATE COLLEGE, PENNSYLVANIA.

SEED-DRILL.

SPECIFICATION forming part of Letters Patent No. 310,584, dated January 13, 1885.

Application filed January 31, 1884. (No model.)

*To all whom it may concern:*

Be it known that I, JOHN HAMILTON, a citizen of the United States, residing at State College, in the county of Centre and State of Pennsylvania, have invented certain new and useful Improvements in Seed-Drills; and I do hereby declare the following to be a full, clear, and exact description of the invention, such as will enable others skilled in the art to which it appertains to make and use the same.

My invention consists in certain improvements in the form of seed-drill patented to me September 26, 1882, No. 264,876. In that patent the claims were for combinations with the drill-tooth and covering-wheel of a pivoted slotted arm or bar connecting the tooth and wheel by means of a pivoted brace, lugs, and an encircling-band, of clamping-plates, and a lifting rod and chain, for the purposes of regulating the depth to which the drill-tooth might be run into the soil, of hoisting the apparatus from the ground, of furnishing means for attaching the apparatus to any form of drill-teeth, and of compressing the soil over the seed without leveling the ridges raised by the drill-teeth. My present improvements have the same general objects in view, but consist in changes and modifications of the different parts by which a better construction and more efficient operation of the apparatus as a whole is obtained, and in connection therewith I have added an adjustable cleaning device to the covering-wheel. These improvements are illustrated in the accompanying drawings, in which—

Figure 1 is a perspective view, Fig. 2 a side elevation, Fig. 3 a detached sectional view, of a clamping device on line $x$ $x$ of Fig. 2; Fig. 4, an elevation in section of the axle-core and hub on line $y$ $y$ of Fig. 2; Fig. 5, a plan view of the apparatus; and Figs. 6 and 7 plan views in section showing mode of connecting the two ends of the band around the drill-tooth, and the connection of the main bar therewith, as hereinafter described.

In the drawings, A represents a drill-tooth of the ordinary form, and B a covering and compressing wheel.

C is a slotted, bar connected with the drill-tooth and the wheel in the following manner: The ends of a strap or band, D, encircling the drill-tooth, as shown, are confined between two plates, $e$ $e$, and between the same plates, above the ends of the straps, is inserted a downwardly-extending lip or projection, $e'$, on the end of the main bar C. Through this projection and through the plates $e$ is passed the bent end of a connecting-rod, F, secured by a burr, $g$, as shown in Figs. 6 and 7. The rod F extends upward, and its opposite end is also bent and passed through the arms $i$ of a slotted and grooved brace and lever, G, and a lug, $h$, cast on the drill-tooth, which lug is embraced by the said arms $i$. This end of the rod F is also screw-threaded and secured by a nut. The brace or lever G thus swinging on the rod F at its upper end is also slotted at its lower end, its arms formed by the slot embracing the upper portion of the slotted arm C, and secured to a small roller or rod running in the slot of arm C.

Cast to the wheel end of arm C is a frame, H, having the slotted arms K and an upright rod, L. The arms K terminate in circular shields $n$, having inner concave recesses to surround and protect the hubs, and prevent clogging by dirt falling from the wheel. These shields $n$ are provided with passages $o$ for the admission of the hubs when the wheel is put in place, as shown in Fig. 4. The wheel B turns upon a hollow axle or core, $m$, which axle is supported by a bolt, $p$, inserted through the shields $n$ and secured on one side by a nut. The ends of the core $m$ are square-shaped, to fit on the square end of the bolt $p$ to hold it in place and prevent it from turning. The outer surface of this axle is also cored out slightly at its center to retain oil and prevent friction.

R is a clamp to control the backward movement of the lever G within the slot of the arm C. It is composed of two plates, $s$ $s$, serrated on their inner surfaces to fit in the serrations of the arm C, which plates are held together by a bolt passing through the slot in arm C, and fixed at any desired point by means of a thumb-screw, $t$.

V is an adjustable cleaner, composed of two parts, $y$ $z$, as shown in the drawings; or it may be cast in one piece, as shown in Figs. 8 and 9. One of these parts, $y$, is provided with a slot, $y'$, and is passed through a slot in one of the shields $n$, back of the end of the hub, and the other part or blade, $z$, extends at right angles to the part $y$ and over the periphery of the wheel B. The slot $y'$ embraces the bolt $p$, and the height of the blade $z$ above the wheel is adjusted by sliding the cleaner on said bolt. The upright rod L in front of the wheel is provided with a hole to receive a lifting-chain, and the sides of the rod are beveled for the purpose of receiving weights with corresponding beveled slots therein, which may be put on and slid down the rod and rest upon the frame H to increase the pressure of the wheel B upon the soil. The end of each bolt supporting the cleaner, the axle, and the clamping-plates is made square to prevent the bolts from turning.

In operation the depth to which the drill-tooth is permitted to penetrate the ground is controlled and regulated by the pivoted brace-lever G, in connection with the main bar C, the rod F, and clamp R. When the tooth strikes an obstruction that lifts it out of the ground, the front end of the main bar is raised, and the lower end of the lever-brace G slides forward in the slot of the main bar; and when the obstruction is passed the tooth comes down by its own weight until the lower end of the lever strikes the clamp R, when the tooth can sink no deeper.

By connecting the lever and the main bar with the drill-teeth in the manner above described, the drill-tooth and its connections are better supported and the machine is held steady in running on uneven ground, and the wheel is caused to run in the furrow made by the tooth. The wheel, by following directly in the furrow made by the tooth, compacts and presses the earth upon and around the seed, while a space of loose soil is left between the wheels, through which moisture and sun-heat easily penetrate and reach the roots of the plants. The pressure of the wheels may be increased by additional weights. Clogging is prevented by the shields around the hubs, the constant easy turning of the wheel insured by the employment of the extra axle, and the wheel cleared of adhering soil by the adjustable cleaner.

Having thus described my improvements what I claim is—

1. In a seed-drill, the combination, with the drill-tooth, of band D, provided with a lug, the plates $e$, between which the ends of said strap are secured, the main bar C, provided with lip $e'$, the connecting-rod F, and the lever-brace G, provided with arms $i$, which embrace the lug $h$, as and for the purpose described.

2. The combination, with the drill-tooth, of the lever-brace G, its upper end provided with arms $i$, by which it is secured to the lug $h$ of the drill-tooth, its lower end slotted to form arms embracing the upper portion of main bar C, the roller or rod to which said arms are connected, the main bar C, the clamp R, composed of the serrated plates $s$, and the thumb-screw $t$, for controlling the backward movement of the lever-brace within the slot of the main bar, substantially as described.

3. The combination, with the main bar, of the frame H, provided with the shields $n$, and the cleaner V, adjustable on said shields, substantially as described.

4. The adjustable cleaner V, provided with a slot, $y'$, in combination with the axle-bolt $p$ and the slotted shield $n$, whereby an arm of the said cleaner is supported and adjusted on said bolt and shield, substantially as described.

In testimony whereof I affix my signature in presence of two witnesses.

JOHN HAMILTON.

Witnesses:
 GLEN. W. COOPER,
 J. H. BLACKWOOD.